United States Patent [19]

Paton et al.

[11] 4,044,223

[45] Aug. 23, 1977

[54] APPARATUS FOR PULSED ARC WELDING AND BUILDING-UP OF ARTICLES

[76] Inventors: Boris Evgenievich Paton, ulitsa Kotsjubinskogo, 9, kv. 21; Vladimir Konstantinovich Lebedev, ulitsa Engelsa, 25, kv. 12; Pavel Petrovich Sheiko, prospekt Nauki, 86/90, korpus 3, kv. 16; Mikhail Petrovich Pashulya, ulitsa Konstantinovskaya, 61, kv. 11; Boris Antonovich Steblovsky, ulitsa Anri Barbjusa, 22/26, kv. 122, all of Kiev, U.S.S.R.

[21] Appl. No.: 566,048

[22] Filed: Apr. 8, 1975

[51] Int. Cl.² .................................................. B23K 9/10
[52] U.S. Cl. .................................. 219/135; 219/131 R
[58] Field of Search ....... 219/131 R, 131 WR, 131 F, 219/135

[56] References Cited

U.S. PATENT DOCUMENTS

| | | | |
|---|---|---|---|
| 3,577,156 | 5/1971 | Paton et al. | 219/131 W |
| 3,588,465 | 6/1971 | Anderson et al. | 219/131 R X |
| 3,588,466 | 6/1971 | Daggett | 219/135 X |
| 3,774,011 | 11/1973 | Aldenhoff | 219/135 X |
| 3,775,585 | 11/1973 | Okada | 219/135 X |
| 3,813,594 | 5/1974 | Toth | 219/131 WR X |
| 3,890,557 | 6/1975 | Bogdanov et al. | 219/135 X |
| 3,902,037 | 8/1975 | Goto et al. | 219/135 |
| 3,906,289 | 9/1975 | Lepp et al. | 219/131 R X |

Primary Examiner—J. V. Truhe
Assistant Examiner—Clifford C. Shaw

[57] ABSTRACT

The proposed apparatus comprises an arc-welding source, including a current pulse generator with a control circuit and a rectifier.

A choke at the output of the rectifier is connected to the electrode-article gap, in series with the rectifier of the pulse generator. The rectifier is a fullwave rectifier and comprises two controlled thyristors and two uncontrolled diodes. As the apparatus is in operation, one of the thyristors becomes conducting during each alternating current half-cycle. Current pulses pass through the arc and choke and are added to the pedestal of the current that continuously flows from the rectifier through the welding circuit.

6 Claims, 15 Drawing Figures

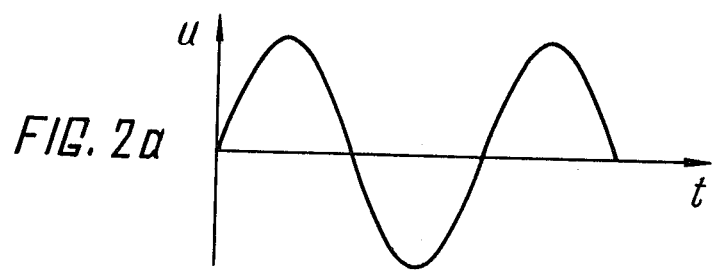
FIG. 2a
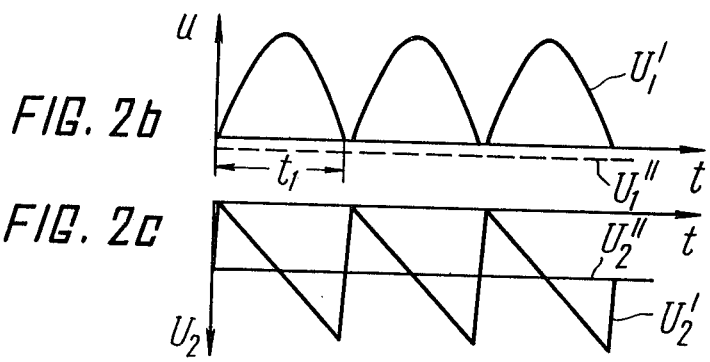
FIG. 2b
FIG. 2c
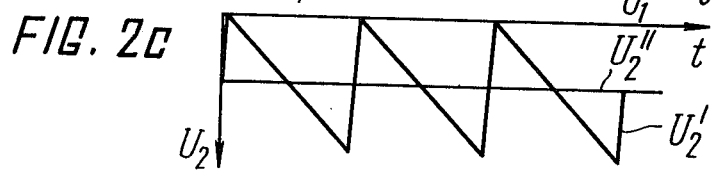
FIG. 2d
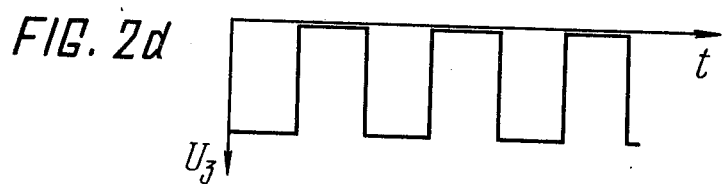
FIG. 2e
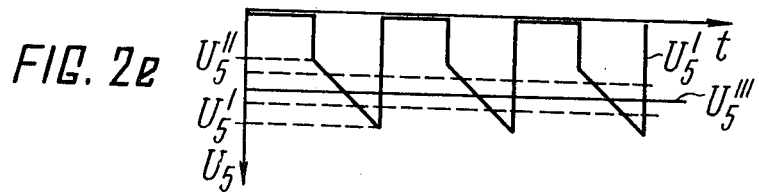
FIG. 2f
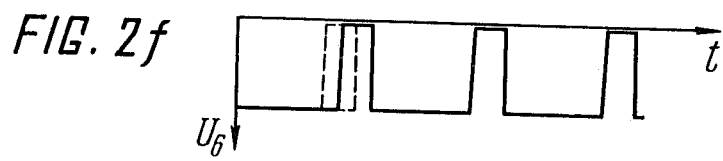

APPARATUS FOR PULSED ARC WELDING AND BUILDING-UP OF ARTICLES

The present invention relates to equipment for arc welding and building-up of articles and, more specifically, to apparatus for pulsed arc welding and build-up of articles.

The invention may be effectively utilized in mechanical engineering, shipbuilding, aircraft and automotive industries, construction and erection work, chemical and oil extraction and processing engineering, and other industries for pulsed arc welding and building-up of fusible electrodes in a protective gas medium, without any welding arc protection, as well as under water, with any spatial positioning of an article being welded.

At present pulsed arc welding is done with the aid of apparatus in which a direct current source and a pulse generator are interconnected in parallel and are thus connected to the electrode-article gap. In most cases, the burning-off of the electrode is effected by current from the direct current source, whereas current pulses sent by the generator are employed for fine spray electrode metal transfer to the welding bath.

The function of direct current sources is performed in such apparatus by three-phase rectifiers with a flat or drooping characteristic. In some cases the function of direct current sources is performed by direct current generators.

The pulse generators are devices which generate sustained oscillations. There have been extensively employed pulse generators which cut off the sinusoidal voltage and thus provide for a pulse repetition frequency equal to a doubled frequency of the alternating current mains; this makes it possible to supply current pulses to two welding apparatus operating at the power line frequency.

In some cases apparatus for pulsed arc welding with a fusible electrode include a feedback unit to eliminate power line fluctuations or to maintain constant the mean value of voltage across the welding arc which is subject to disturbances in the course of welding (power line fluctuations, non-uniform introduction of an electrode into the welding zone, spray electrode metal transfer, etc.).

If a direct current source and a pulse generator are connected in parallel, the passage of current pulses through the arc electrode-article gap results in the blocking of the direct current source by the pulse voltage whose magnitude is in excess of the output voltage of the direct current source. The degree of the direct current source blocking depends upon the dynamic properties and output voltage of that source, as well as upon the shape, amplitude and duration of the output pulse voltage produced by the generator; it is also determined by the electrical characteristics of the circuit to which both power sources are connected.

As a result, the welding current generated by the direct current source decreases with the pulse duration, i.e. it deviates from its preset magnitude which is a pedestal.

As the action of the pulse is over, the original magnitude of the welding current supplied by the direct current source cannot be restored instanter due to a time lag in the welding circuit. Such periodical drops in current and voltage pedestal magnitudes, corresponding to the pulse repetition frequency, are felt most strongly in low current welding and affect the arcing stability. This is due to the fact that following the passage of a pulse, the voltage and current magnitudes are beyond the values of the power parameters of the arc which ensure stable arcing and high-quality welding.

For this reason, the existing apparatus prove to be impractical for pulsed arc welding of thin articles, as an increase in the welding current magnitude, aimed at maintaining the arcing stability, leads to the burning of articles being welded.

Apart from the foregoing considerations, automatic regulation of the mean magnitude of voltage across the arc, which is effected by varying the pulse duration, does not provide for an adequate regulation accuracy, as part of pulse voltage must compensate the voltage drop across the arc due to the blocking of the direct current source.

During the passage of pulses through the arc, with parallel connection of arc-welding sources, the direct current source runs idle, because it is being blocked, whereas its rectifier is under the dynamic action of the inverse voltage of the generator, which leads to its rapid wear. Therefore, the existing apparatus with parallel connection of a direct current source and a pulse generator are not economical.

The foregoing disadvantages stemming from parallel connection of the direct current source and pulse generator account for the fact that such apparatus are impractical.

It is an object of the present invention to provide an apparatus for pulsed arc welding, which would improve the quality of welds.

It is another object of the present invention to expand the magnitude range of welding currents so as to make it possible to weld thin articles.

The foregoing and other objects of the invention are attained by providing an apparatus for pulsed arc welding and building-up of articles, comprising a rectifier with a choke at its output, and a controlled pulse generator with a rectifier at its output, both being connected to an electrode-article gap, in which apparatus the rectifier of the pulse generator is connected, in accordance with the invention, to the electrode-article gap in series with the choke and is constructed so that irrespective of the state of its rectifier cells, a welding current with a predetermined pedestal continuously flows through the arc gap from the choke.

In the course of operation of the proposed apparatus, pulses generated by the pulse generator are added, upon their passage through the welding arc, to the welding current supplied from the choke and have no effect upon the magnitude of that current. In the course of welding the direct current source is never blocked; the welding current is continuous, with no variations in its magnitude.

This improves the arcing stability and, consequently, the welding quality. In addition, the foregoing connection of the arc-welding sources has made it possible to expand the magnitude range of welding currents, which, in turn, reduces the heat transfer to the metal being welded and makes it possible to weld thin articles. The addition of voltages of the direct current source and the pulse generator, because of their series connection, improves the accuracy of maintaining the mean value of voltage across the arc. This also accounts for a higher welding quality.

According to an alternative embodiment of the invention, the proposed apparatus may have a rectifier of a pulse generator, which rectifier comprises a step-down transformer and a rectifier bridge made up of two seriesly connected thyristors and two seriesly connected diodes, the points of connection of the thyristors and the diodes being connected to the secondary winding of the transformer, whereas the output of the rectifier bridge, formed by the points of connection of the cathodes and anodes of the thyristors and diodes, is connected to the electrode-article gap, in series with the choke, the control electrodes of the thyristors being connected to the output of the control circuit of the generator.

The positive output of the rectifier bridge of the pulse generator may be connected to the cathode, and the negative output thereof, to the anode of an additional diode connected to the electrode-article gap, in series with the choke.

The presence of the additional diode at the output of the rectifier bridge of the pulse generator makes it possible to relieve the rectifier cells of the generator's rectifier of the current supplied from the rectifier of the direct current source, which enhances the reliability of the apparatus.

According to another alternative embodiment of the propoposed apparatus, the rectifier of the pulse generator comprises a step-down transformer and a rectifier bridge made up of two thyristors and two diodes so that the points of connection between the cathode of a thyristor and the anode of a diode are connected to the secondary winding of the transformer, the positive output of the bridge being connected to the cathode, whereas the negative output of the bridge is connected to the anode of an additional diode connected to the electrode-article gap, in series with the choke, the control electrodes of the thyristors being connected to the output of the control circuit of the generator.

The presence of the additional diode at the output of the rectifier bridge of the pulse generator makes it possible to utilize standard pulse generators.

According to still another alternative embodiment of the invention, the rectifier of the pulse generator comprises a step-down tranformer whose primary winding is connected to the power line via thyristors placed in parallel opposition, whose control electrodes are connected to the output of the generator's control circuit, and a rectifier bridge made up of diodes, the input points of the bridge being connected to the secondary winding of the transformer, whereas the output points are connected to the electrode-article gap, in series with the choke.

It is highly desirable that the control circuit of the generator comprise two seriesly connected integrating stages whose output is coupled to the electrode-article gap, a mean arc voltage value setter feeding a driving voltage generator, whose voltage is compared to a direct voltage of a divider, as well as a difference signal amplifier, a differentiating circuit, and a blocking generator whose output is connected to the control electrodes of the thyristors, there being connected to the input of the driving voltage generator a series circuit made up of an amplifier, a saw-toothed wave generator, and a frequency stabilizer synchronized with the voltage across the primary winding of the transformer of the pulse generator.

The electronic circuit for controlling the pulse generator makes it possible to smoothly adjust the pulse duration in order to accurately select the desired welding conditions and carry out automatically controlled welding so as to maintain constant the mean arc voltage value despite considerable disturbances to which the arc is subjected in the course of welding. the proposed generator control circuit substantially improves the performance of the welding apparatus.

Other objects and advantages of the present invention will become more apparent from the following detailed description of preferred embodiments thereof to be read in conjunction with the accompanying drawings, wherein.

Figure 1:
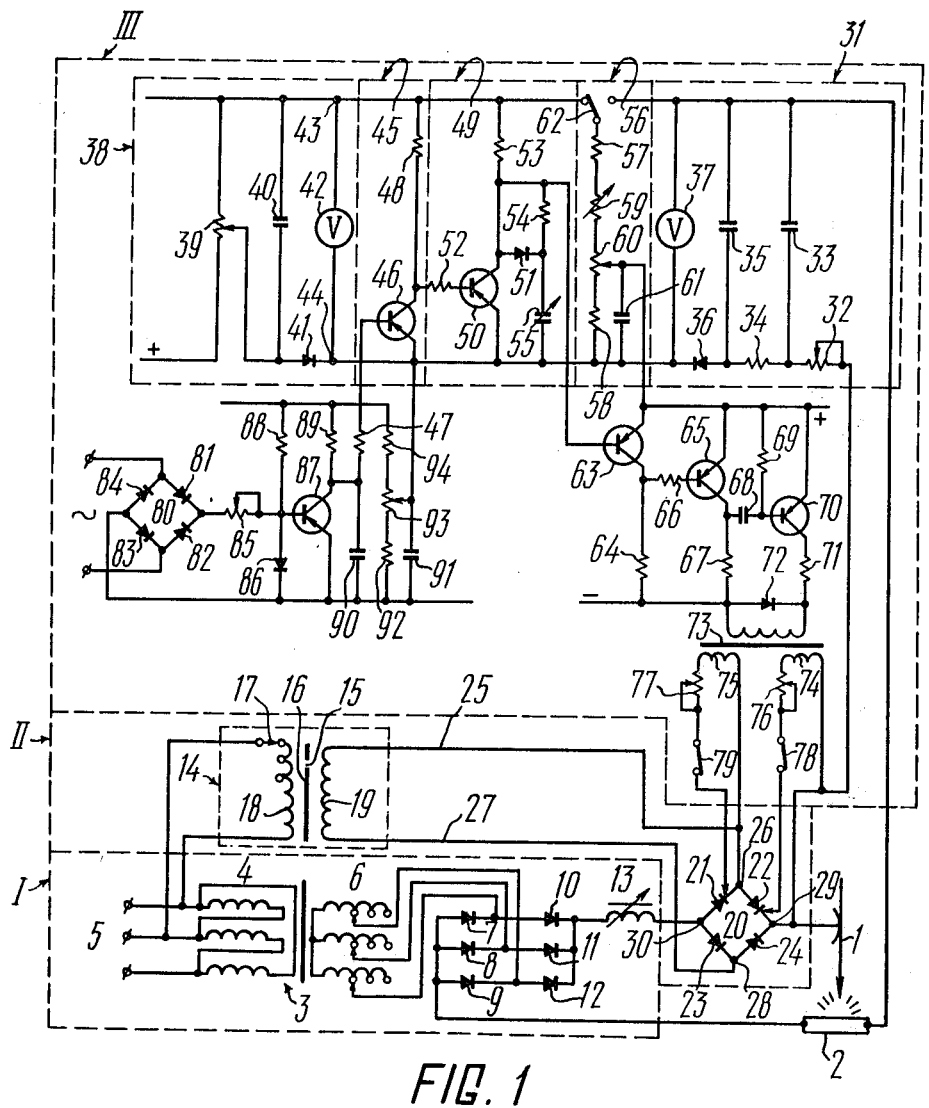
FIG. 1 is a circuit diagram of an apparatus in accordance with the invention.
Figure 2G:
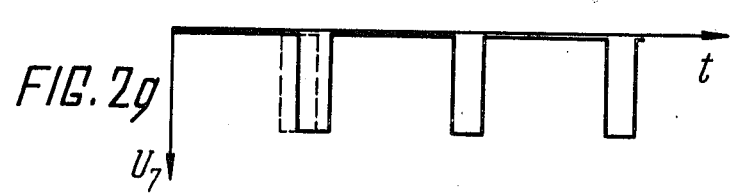
FIG. 2 (a through m) shows time plots illustrating the operation of the apparatus in accordance with the invention.
Figure 2H:
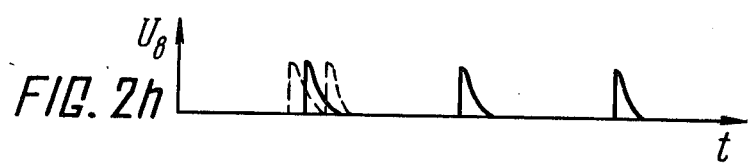
Figure 2K:
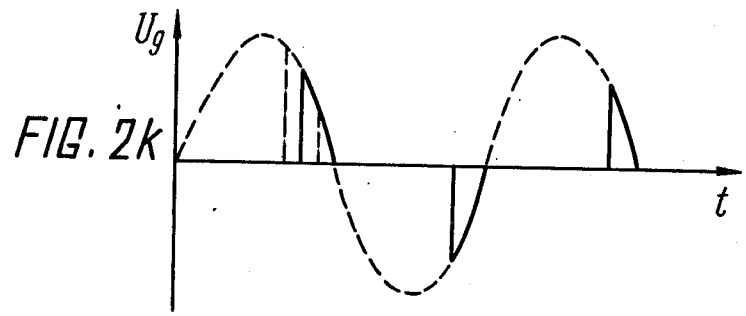
Figure 2L:
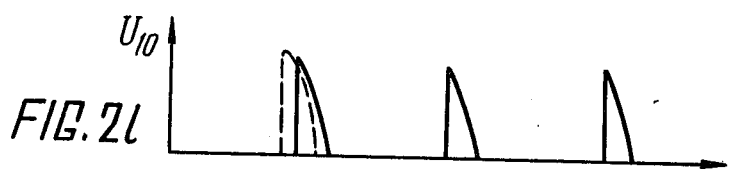
Figure 2M:
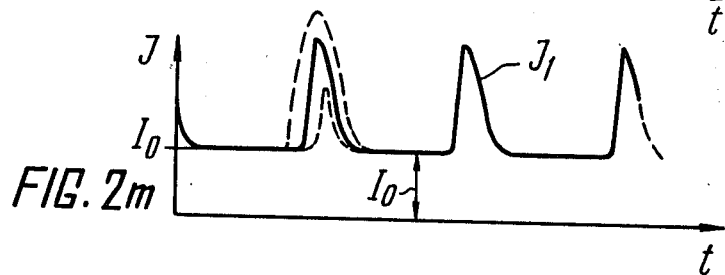

Referring now to the attached drawings, the proposed apparatus for pulsed arc welding and building-up of articles comprises a rectifier I (FIG. 1), a pulse generator II and an electronic circuit III for controlling operation of said generator II.

The rectifier I is a direct current source which ensures continuous arcing between an electrode 1 and an article 2. The rectifier I is constructed as a three-phase transformer 3 whose primary windings 4 are connected to a three-phase power line 5, whereas its adjustable secondary windings 6 are connected to three-phase electric valves 7, 8, 9, 10, 11 and 12. Placed at the output of this three-phase rectifier circuit is a variable inductance choke 13.

The pulse generator II, which provides for the fusion and transfer of electrode metal to a welding bath (not shown), comprises a single-phase transformer 14 with an air gap 15 in a magnetic circuit 16 and a primary winding 18 which is adjustable with the aid of a switch 17. Placed in parallel with a secondary winding 19 of the transformer 14 is a rectifier 20 whose full-wave rectifier circuit comprises two controlled thyristor valves 21 and 22 and two uncontrolled diode valves 23 and 24. One lead 25 of the secondary winding 19 of the transformer 14 is connected to a point 26 of the rectifier 20, between the two thyristor 21 and 22, whereas its second lead 27 is connected to a point 28 of the rectifier 20, between the two diodes 23 and 24. At points 29 and 30, an output of the rectifier 20 is connected to an electrode 1 - article 2 gap, in series with the choke 13 of the rectifier I.

The control circuit III of the pulse generator II comprises a unit 31 for measuring the mean arc voltage value, which is constructed in the form of two seriesly connected integrating RC circuits including a resistor 32, a capacitor 33 and a resistor 34 with a capacitor 35, as well a a diode 36 and a voltmeter 37.

The circuit III has a mean arc voltage value setter 38 which includes an adjustable potentiometer 39, a capacitor 40 and a diode 41 with a voltmeter 42 energized with stabilized voltage. The output of the setter 38 is connected at points 43 and 44 to an amplifier 45 built around a transistor 46 and resistors 47 and 48, to a driving voltage generator 49 built around a transistor 50, a diode 51, resistor 52, 53 and 54 and a capacitor 55, and to a voltage divider 56 built around resistor 57 and 58, adjustable resistors 59 and 60 and a capacitor 61. In automatic welding conditions said divider 56 may be connected with the aid of a switch 62 to the voltmeter 37 of the unit 31 for measuring the mean arc voltage value.

The formation of control pulses by the thyristors 21 and 22 is effected by amplifying the difference signal between the output voltage of the generator 49 and a present constant voltage across the capacitor 61 of the voltage divider 56. This amplifier is built around a transistor 63 and a resistor 64. The output of said amplifier is connected to an input of an inverter built around a transistor 65 and resistors 66 and 67. Placed at the output of said inverter is a differentiating CR circuit including a capacitor 68 and a resistor 69, which circuit controls a blocking generator built around a transistor 70, a resistor 71, a diode 72 and a transformer 73. The transformer 73 has two secondary windings 74 and 75 which are connected via resistors 76 and 77 and switches 78 and 79 to the control electrodes (not shown) of the respective thyristors 21 and 22 of the generator II.

In addition, the circuit III includes a frequency stabilizer comprising a fullwave rectifier bridge circuit 80 built around diodes 81, 82, 83 and 84, a resistor 85 and a diode 86. The input voltage supplied to the rectifier bridge 80 is synchronized with the voltage across the primary winding 18 of the transformer 14 of the generator II.

The output of the diode 86 of the frequency stabilizer controls a sawtoothed voltage generator built around a transistor 87, resistor 88 and 89 and a capacitor 90. The output sawtoothed voltage of the generator is compared, between the emitter and base of the transistor 46 of the amplifier 45, to direct voltage across a capacitor 91 connected to a voltage divider built around resistors 92, 93 and 94.

The apparatus of FIG. 1 operates as follows.

As the apparatus is switch on, the welding arc produced by the shorting of the electrode 1 against the article 2 is supplied with direct current from the rectifier I and with current pulses from the generator II. The direct current from the rectifier I produces a constant driving component known as pedestal.

FIG. 2 (a through m) shows time plots illustrating operation of the apparatus.

Alternating voltage U (FIG. 2a), synchronized with the voltage across the primary winding 18 of the transformer 14, is supplied at the input of the rectifier bridge 80, so that a pulsating voltge $U_1'$ (FIG. 2b) is discriminated to the diode 86, which voltage keeps the transistor 87 non-conducting until its instantaneous value is greater than automatic bias voltage $U_1''$ generated by the current circuit of the base of the transistor 87 via the resistor 88. The cut-off time $t_1$, i.e. the time during which the transistor 87 remains non-conducting, amounts to 0.95 of the half-wave time of the sinusoidal voltage U (FIG. 2a) which energizes the transformer 14 of the pulse generator 11.

During the time $t_1$ the capacitor 90 is charged through the resistor 89 according to a law which is close to the linear law (FIG. 2c). As soon as the instantaneous value of the pulsating voltage $U_1'$ across the diode 86 is less than the automatic bias voltage $U_1''$ (FIG. 2b) of the transistor 87, the latter is driven into conduction, and the capacitor 90 is fully discharged through its emitter-collector junction (FIG. 2c).

Thus, a sawtooth voltage $U_2'$ (FIG. 2c) appears across the capacitor 90, whose frequency is double that of the alternating voltage U (FIG. 2a) energizing the transformer 14 of the generator II. The sawtooth voltage $U_2'$ across the capacitor 90 is compared to the voltage $U_2''$ that renders the transistor 46 non-conducting, which latter voltage is produced by a rheostat voltage divider built around resistors 92, 93 and 94 and is taken off the capacitor 91. As soon as the value of the sawtooth voltage $U_2'$ across the capacitor 90 becomes greater than the voltage $U_2''$ across the capacitor 91, the transistor 46 (FIG. 2d) is driven into conduction, and the transistor 50 is rendered non-conducting by voltage $U_3$ between the emitter and collector of the transistor 46, which becomes equal to zero. As the transistor 50 is non-conducting, the capacitor 55 is also charged according to the linear law via the resistors 53 and 54. The value of the voltage $U_5'$ (FIG. 2e) across the circuit including the resistor 54 and the capacitor 55 at the moment of cutting off the transistor 50 differs from zero by the magnitude of a drop in the voltage $U_5''$ across the resistor 54, as at the moment of communication voltage across the capacitor 55 is zero.

At the moment of cutting off the transistor 46, the transistor 50 becomes conducting, and the capacitor 55 is discharged through its emitter-collector junction and the diode 51; the voltage $U_5$ across the resistor 54 and the capacitor 55 is reduced to zero.

The value of the output voltage $U_5'$ (FIG. 2e) of the driving oscillator, which is observed between the emitter and collector of the transistor 50, across the resistor 54 and the capacitor 55, is compared to the voltage $U_5'''$ produced by the rheostat voltage divider 56, which voltage is taken off the capacitor 61. As soon as the output voltage $U_5'$ of the driving oscillator is in excess of the voltage $U_5'''$ across the capacitor 61, the transistor 63 becomes conducting (FIG. 2f; where $U_6$ is the voltage between the emitter and collector of the transistor 63), whereas the transistor 65 becomes non-conducting (FIG. 2g, where $U_7$ is the voltage between the latter's emitter and base). At the moment the transistor 65 is driven from conduction to non-conduction, there appears a pulse at the output of the differentiating circuit including the capacitor 68 and the resistor 69, which pulse drives the transistors 70 of the blocking generator into conduction, the blocking generator operating in the stand-by mode. Pulse current flows through the collector circuit of the transistor 70, the resistor 71 and the primary winding of the transformer 73, whereas in its secondary windings 74 and 75 pulse voltage $U_8$ (FIG. 2h) is induced, which voltage $U_8$ is applied via the resistor 76 and the switch 78, and the resistor 77 and the switch 79 to the respective control electrodes of the thyristors 21 and 22. The thyristor 21 or 22, whereto an alternating voltage half-wave, which is positive for this thyristor, is applied from the secondary winding 19 of the transformer 14, becomes conducting at the moment current passes through the circuit of its control electrodes (FIG. 2l), and a current pulse $I_1$ (FIG. 2m) passes through the arc and the choke 13. At each half-cycle of the alternating voltage U the respective thyristor 21 or 22 is driven into conduction.

Current pulses $I_1$ thus produced pass through the arc and the choke 13 and are added to the pedestal of the current $I_c$ from the rectifier I, which current continuously flows along the circuit composed of the choke 13, the diodes 23 and 24, and the arc.

There is thus effected the addition of currents from the pulse generator II and the rectifier I, which causes no blocking of the latter and has no effect upon the value of its pedestal.

To provide for a current pulse repetition frequency equal to the frequency of the power line, the control circuit of one of the thyristors is disconnected with the aid of the switches 78 or 79.

In cases of series disturbances acting upon the arc in the course of welding, which disturbances may be caused by variations in the alternating voltage of the power line, non-uniformity of feeding the electrode 1 due to imperfections in the feeding means, variations in the length of the arc gap in semi-automatic welding and other factors, the proposed apparatus may operate as a closed circuit, i.e. as an automatic control system for maintaining a mean voltage magnitude across the arc.

In this case the apparatus of the present invention operates as follows.

The welding arc is supplied with direct current from the rectifier I and with current pulses from the generator II, whose nominal duration is set by the potentiometer 39 (FIG. 1), with the voltage across the voltmeter 42 not being zero, in order to ensure optimum conditions for pulsed arc welding. The voltmeter 37 indicates the corresponding mean voltage magnitude across the arc in the course of welding a test article. The rheostat divider 56 is connected in this case by means of the switch 62 to the setter 38. The means voltage magnitude across the arc is then set with the aid of the potentiometer 39, using the indication of the voltmeter 42, which voltage is equal to that measured by the voltmeter 37; the rheostat divider 56 is then connected by means of the switch 62 to the unit 31, in parallel with the voltmeter 37.

Under the automatic control conditions, the value of the output voltage $U_5'$ (FIG. 2e) across the resistor 54 and the capacitor 55 of the driving oscillator is compared to that of the voltage $U_5'''$ across the capacitor 61, which latter voltage is proportional to the mean voltage value across the arc.

Depending upon the value of the difference signal applied to the input of the transistor 63, which is proportional to the deviation of the mean voltage value across the arc from the nominal value, there occurs a change in the flow angle of the thyristors 21 and 22. This brings about changes in the duration of pulses applied to the arc via said thyristors 21 and 22 and the choke 13, whereby variations in the mean voltage value across the arc are compensated.

The elements 55, 59 and 93 of the control circuit III are made adjustble so as to obtain astatic and static characteristics of the automatic control system, which makes it possible to vary within a broad range the static factor of the system.

Figure 3:
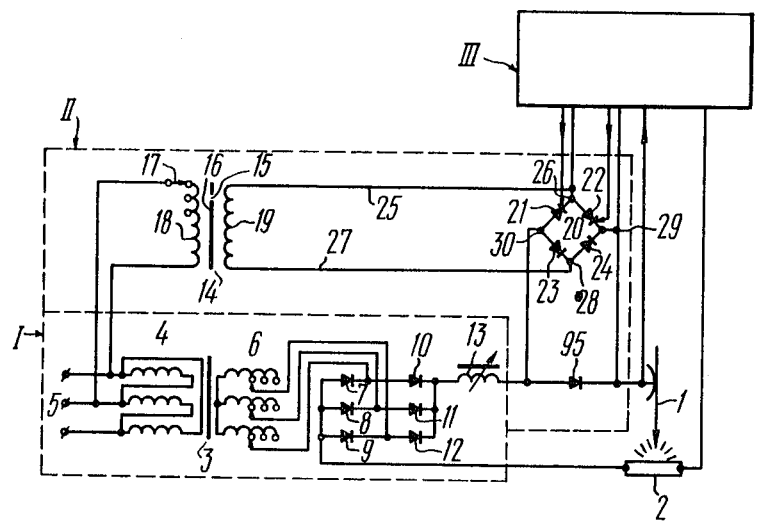
FIGS. 3, 4 and 5 are alternative circuit diagrams of the apparatus in accordance with the invention.

The circuitry of an alternative embodiment of the present invention (FIG. 3) differs from the one described above only in that the positive output of the rectifier 20 is connected at the point 29 to the cathode, whereas the negative output is connected at the point 30 to the anode of an additional diode 95 which is connected to the electrode 1 - article 2 gap, in series with the choke 13.

In this case the welding current from the rectifier I bypasses the diodes 22 and 23 of the rectifier 20 of the generator II and flows through the diode 95. The diode 95 is selected depending upon the magnitudes of the welding current from the rectifier I and the inverse voltage $U_{10}$ (FIG. 2b) across the output of the rectifier 20, at the points 29 and 30. In what follows the operation of the apparatus of FIG. 2 is similar to that of FIG. 1.

Figure 4:
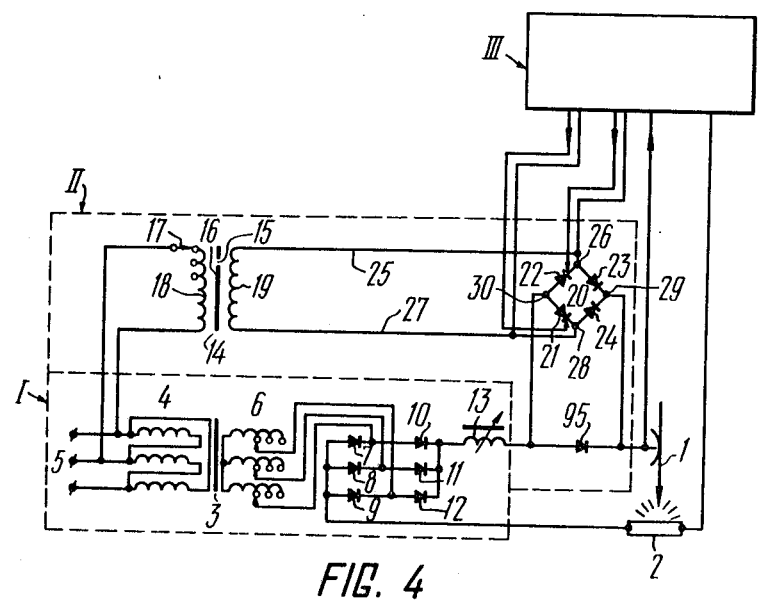

In the apparatus of FIG. 4 the secondary winding 19 of the transformer 14 is connected with its terminal 25 and 27 to the points 26 and 28, respectively, which points are formed by the cathode of the thyristors 22 and 21 and the plate of the diodes 23 and 24 of the rectifier 20. The positive output of the rectifier 20 is connected at the point 29 formed by the coupling of the cathodes of the diodes 23 and 24 to the cathode of the additional diode 95, whereas its negative output is connected at the point 30 formed by the coupling of the anodes of the thyristors 21 and 22 to the plate of the diode 95 which is connected to the electrode 1 - article 2 gap, in series with the chocke 13. The control electrodes of the thyristors 21 and 22 are connected to the output of the circuit III. From the rectifier I the welding current flows through the diode 95, as is the case with the circuitry of FIG. 3; operation of the apparatus under review is similar to that of the apparatus of FIG. 1.

Figure 5:
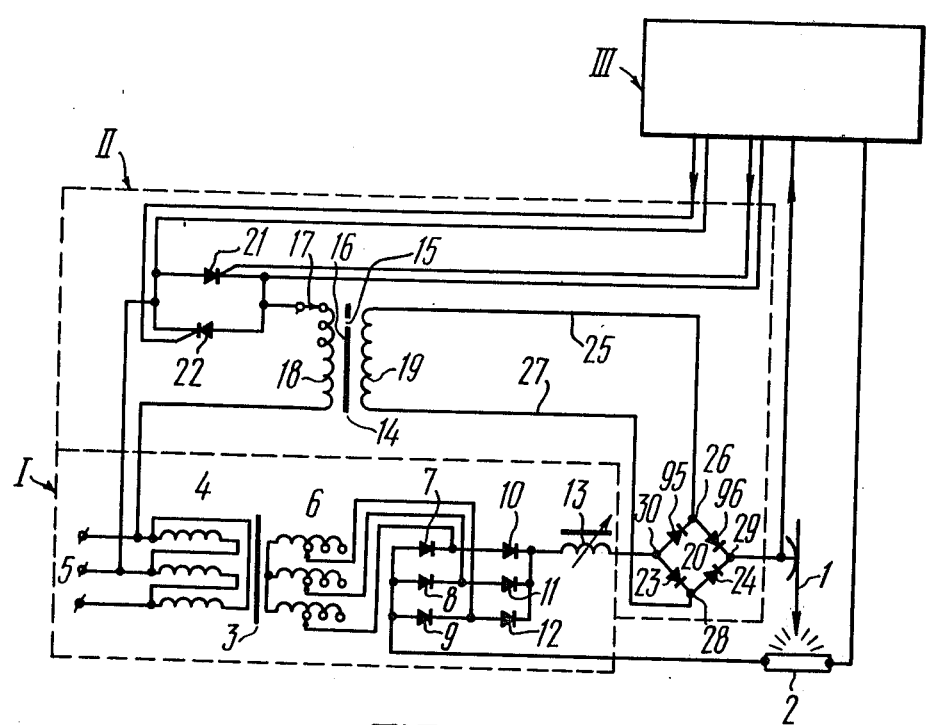

In the embodiment shown in FIG. 5 the thyristors 21 and 22, which are interconnected in parallel opposition, are connected to the power line 5 in series with the primary winding 18 of the transformer 14, which primary winding 18 is adjustable with the aid of the switch 17. The terminals 25 and 27 of the secondary winding 19 of the transformer 14 are connected to the points 26 and 28, respectively, of the bridge circuit of the rectifier 20 of the generator II, which bridge circuit is composed of the diodes 23, 24, 95 and 96. The output of this circuit is connected at the points 29 and 30 to the electrode 1 - article 2 gap, in series with the choke 13.

As a control signal arrives at the control electrode (not shown) of the thyristors 21 and 22, during the position half-cycle the thyristor 21 or the thyristor 22 are rendered conducting so that through the primary winding 18 of the transformer 14 there flows alternating pulse current which induces an alternating pulse voltage $U_9$ (FIG. 2k) across its secondary winding 19. The voltage $U_9$ is rectified with the aid of the rectifier 20.

From the rectifier I the welding current flows via the diodes 23, 24, 25 and 27 of the rectifier 20.

In what follows the operation of the apparatus of FIG. 5 is similar to that of the previously discussed embodiments.

What is claimed is:

1. An apparatus for pulsed arc welding and building-up of articles, comprising: a rectifier (I) having a three-phase input and a choke (13) at its output; a current pulse generator (II) having a transformer (14) with a primary (18) and a secondary (19), a rectifier (20) at its output, and a control circuit (III) also having an output and an input; said rectifier (20) of said generator having a number of cells and being connected to an electrode (1) and an article (2) with an arc gap therebetween, in a series connection with said choke, said rectifier (20) of said generator being constructed and including means for producing a welding current which flows continuously, having a preset threshold value, from said choke through said arc gap, irrespective of the state of said cells of the rectifier; said electrode and article being connected to said input of the control cirucit, whose output is connected to control electrodes (at 21, 22) in the rectifier (20) of said current pulse generator.

2. The apparatus as defined in claim 1, wherein said control circuit (III) includes two serially connected integrating stages (32 to 37) whose inputs are connected to said gap; a mean arc-voltage value setter (38 to 41) connected to the outputs of the integrating stages for energizing a driving voltage generator (49) having an output with a voltage that is compared with a constant voltage of a divider (56); a difference signal amplifier (45) for producing a signal corresponding to the voltage difference measured in said generator (49); a differentiating circuit (68, 69) coupled to said amplifier (45); a blocking generator (70 to 75) connected to said differentiating cirucit and having an output connected to said control electrodes (21, 22); and a series circuit incorporating an amplifier (63, 64), a sawtooth voltage generator (87 to 90) with a resistor cut-off voltage divider (92 to 94), and a frequency stabilizer (80 to 86) synchronized with the voltage across said primary (18) of the transformer (14); said series circuit being connected to said output of the driving voltage generator.

3. The apparatus as defined in claim 1, wherein said transformer (14) is a step-down transformer associated with a rectifier bridge (7 to 12) having an output, said rectifier 20 including two serially connected thyristors (21, 22) which have said control electrodes therein, and two serially connected diodes (23, 24), so that junction points of said thyristors and diodes are connected to said secondary (19) of the transformer, whereas said output of the bridge is connected to said junction points of respective cathodes and anodes of said thyristors and said diodes, and is in said series connection with said article and electrode.

4. The apparatus as defined in claim 3, further comprising an additional diode (95) connected to said article and electrode also in series with said choke (13); and wherein the positive output of said bridge (7 to 12) is connected to the cathode and its negative output of the anode of said additional diode.

5. The apparatus as defined in claim 1, wherein said transformer (14) is a step-down transformer associated with a rectifier bridge (7 to 12) having an output; said bridge being composed of two thyristors (21, 22) and two diodes (23, 24) so that junction points between cathodes of said thyristors and anodes of said diodes are connected to said secondary (19) of the transformer, whereas the positive output of said bridge is connected to said cathodes; further comprising an additional diode (95) connected to said article and electrode, also in series with said choke (13); and wherein control electrodes of said thyristors are connected to said output of the control circuit (III).

6. The apparatus as defined in claim 1 wherein said primary (18) of the transformer (14) is connected to the three phase input (5) with said thyristors (21, 22) placed in parallel opposition control electrodes of said thyristors being connected to said output of the control circuit (III), and further comprising a rectifier bridge (7 to 12) composed of diodes, the input points of said bridge being connected to said secondary (19) of the transformer, whereas the output points of said bridge are in said series connection with said article and electrode.

* * * * *